United States Patent [19]

Volleau et al.

[11] Patent Number: 4,589,102
[45] Date of Patent: May 13, 1986

[54] DEVICE FOR COMPENSATING THE LACK OF BALANCE OF A DEVIATING MIRROR BELONGING TO AN OPTICAL SYSTEM FOR ILLUMINATING A DATA MEDIUM

[75] Inventors: Patrick Volleau; Claude Bricot; Michel Audouin; Dominique Leterme; Jean P. Le Merer, all of Paris, France

[73] Assignee: Thomson-CSF, Paris, France

[21] Appl. No.: 632,280

[22] Filed: Jul. 20, 1984

Related U.S. Application Data

[63] Continuation of Ser. No. 335,527, Dec. 29, 1981, abandoned.

[30] Foreign Application Priority Data

Dec. 29, 1980 [FR] France ................ 80 27694

[51] Int. Cl.⁴ ............................................. G11B 7/095
[52] U.S. Cl. ........................................ 369/46; 369/44; 369/119; 250/202
[58] Field of Search ............... 369/112, 44, 46, 119, 369/111; 360/77; 318/577; 250/202

[56] References Cited

U.S. PATENT DOCUMENTS

| | | |
|---|---|---|
| 3,588,218 | 6/1971 | Hunt et al. . |
| 3,654,624 | 4/1972 | Becker ................ 346/76 L |
| 3,944,727 | 3/1976 | Elliott ................... 369/44 |
| 3,978,278 | 8/1976 | Bouwhuis ............. 369/112 |
| 4,268,745 | 5/1981 | Okano .................. 369/44 |
| 4,344,164 | 8/1982 | Bricot .................. 369/44 |
| 4,423,496 | 12/1983 | Opheij ................. 369/46 |

FOREIGN PATENT DOCUMENTS

| | | |
|---|---|---|
| 0012603 | 6/1980 | European Pat. Off. . |
| 2805458 | 8/1978 | Fed. Rep. of Germany . |
| 2174353 | 10/1973 | France .................. 369/44 |
| 2197495 | 3/1974 | France .................. 369/44 |
| 2294605 | 7/1976 | France . |
| 2349911 | 11/1977 | France . |
| 17703 | 2/1979 | Japan ................... 369/46 |
| 1133480 | 11/1968 | United Kingdom ........ 369/100 |
| 1451799 | 10/1976 | United Kingdom ........ 369/44 |

OTHER PUBLICATIONS

Patents Abstracts of Japan, vol. 2, No. 121, 10/12/78, p. 7078E78 and JP-A-53-87203 (Nippon Victor) (01-08-1978).
Patents Abstracts of Japan, vol. 1, No. 37, 13-03-1978, p. 102E78 and JP-A-53-3305 (Mitsubishi Denki) (13-01-1978).
Patents Abstracts of Japan, vol. 4, No. 78, 6/6/80, p. 26P14 and JP-A-55-42304 (Universal Paionia) (25-03-1980).

Primary Examiner—Alan Faber
Attorney, Agent, or Firm—Oblon, Fisher, Spivak, McClelland & Maier

[57] ABSTRACT

A device makes it possible to eliminate the imbalance of a deviating mirror of an optical system which illuminates a data medium or support when that mirror is subject to rapid displacement. The imbalance is cancelled by the use of a photodetector device which receives the light reflected by a reflecting element positioned around the objective of the optical system which illuminates the medium. A control device then makes it possible to control the position of the mirror based upon the light given off by the reflecting element.

6 Claims, 4 Drawing Figures

DEVICE FOR COMPENSATING THE LACK OF BALANCE OF A DEVIATING MIRROR BELONGING TO AN OPTICAL SYSTEM FOR ILLUMINATING A DATA MEDIUM

This application is a continuation of application Ser. No. 335,527, filed Dec. 29, 1981, now abandoned.

BACKGROUND OF THE INVENTION

The invention relates to a device for preventing the lack of balance of a galvanometer mirror in an optical head during the displacement of the latter, said optical head giving access to a track on a data medium or support.

The invention more particularly relates to reading and recording systems in which the data medium is a disk. At present, it is possible to record approximately $10^{10}$ data bits on a disk with a diameter of approximately 30 cm. These systems can be used as mass memories for digital data processing systems. They make it possible to have a random access to a predetermined part of the recorded data, e.g. a block of binary words of fixed or variable length. However, the computing speed of data processing units makes it necessary to have numerous exchanges between these peripheral memories and the computing units. It is therefore necessary that access to a predetermined track of a moving data medium is obtained as rapidly as possible, for the purpose of reading prerecorded data or for recording such data, no matter what the position of the track on the disk. The average access time must be less than 100 milliseconds.

The existing single track access devices are essentially intended for disks on which the recorded data contains a video signal. The access time to the data is such systems is a few seconds, which is adequate in such cases.

In the hitherto known access devices, the correct radial positioning of an optical recording and/or reading head is brought about by mechanical means ensuring either the displacement of the head, or more frequently, the displacement of the disk. When the reading head and disk are correctly positioned relative to one another, the radial following of the circular or helical track on which the data is recorded or is to be recorded, is brought about by means of a galvanometer mirror which moves around an axis parallel to the plane of the disk, which reflects a beam produced by at least one light energy source comprising a laser. The head also comprises a device ensuring the vertical control of the lens used for recording and reading.

French Patent Application 79 19 973 filed on Aug. 3, 1979 and the corresponding U.S. Pat. No. 4,344,164 proposes an access device with a track on a moving data medium or support, which can be optically recorded or read by a focused radiation. In this device, the recording-reading head is integral with a moving element. A fixed laser energy source and magnifying optical means of the afocal type ensure the connection between the energy source and the recording-reading head. This magnification is then sufficient for the beam emerging from these optical means to completely cover the entrance pupil of the objective. The fixed light energy source comprises at least one radiating element, which produces a beam of parallel rays centered about an axis.

This beam is trapped by the moving element, which moves parallel to the said axis with respect to the data medium. This moving element comprises a galvanometer deviating mirror and an objective, which focuses the beam on the predetermined track of the medium. This mirror permits a radial control of the optical head.

During the rapid displacement of the carriage, said galvanometer mirror can rotate about its rotation axis, the rotation being due to the high acceleration resulting from the rapid displacement. However, this rotation disturbs the operation of the radial control system. The positioning time of the optical head is increased by the same amount.

BRIEF SUMMARY OF THE INVENTION

The object of the invention is to obviate the aforementioned disadvantage by preventing an imbalance in the galvanometer mirror during rapid displacement of the optical head.

The present invention therefore relates to a device for compensating the lack of balance of a pivoting deviating mirror belonging to the moving part of an optical system for illuminating a data medium or support. The system includes a light source which illuminates, via the deviating mirror, the entrance pupil of an objective projecting a light spot illuminating the support, a motor for pivoting the mirror and control means permitting the following by the the spot of a track carried by the aforementioned medium. The lens is provided with a reflecting element surrounding the entrance pupil. A photodetector means collects, during the return travel, the light reflected by the reflecting element and supplies a signal indicating the angular lack of balance of the deviating mirror. The control means has a control input, which receives the signal in order to stop the lack of balance.

The invention also relates to a device for the optical transcription of data stored on a track of a data medium comprising such an imbalance compensating device.

BRIEF DESCRIPTION OF THE DRAWINGS

The invention is described in greater detail hereinafter relative to non-limitative embodiments and the attached drawings, wherein.

FIGS. 2, 3 and 4 illustrate three aspects of the device according to the invention.

DETAILED DESCRIPTION OF THE PREFERRED EMBODIMENTS

Figure 1:
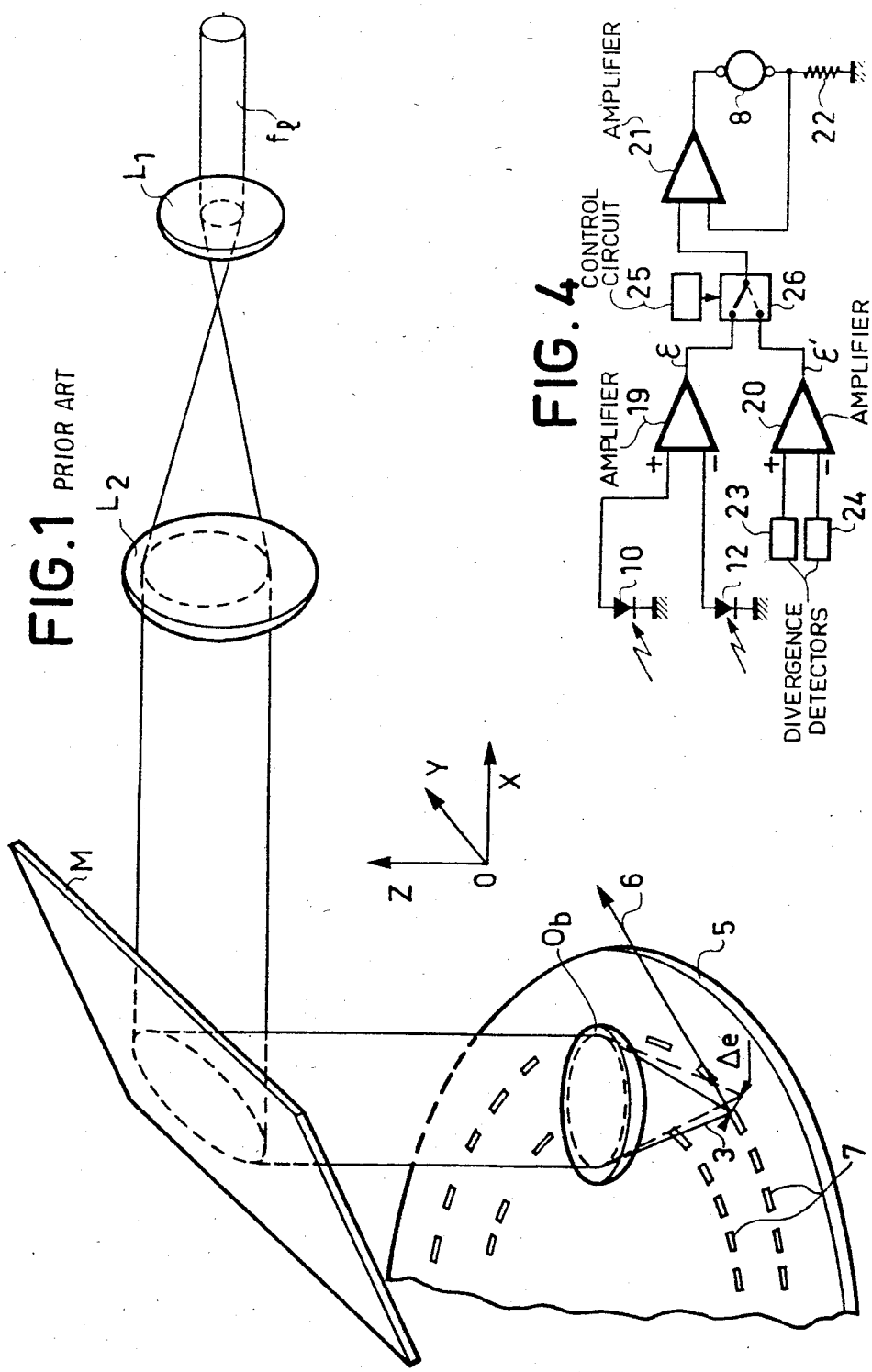
FIG. 1 shows the operation of the prior art device.

The device according to FIG. 1 gives access to one of the tracks of a data medium or support and more particularly to a predetermined track of a disk. It is advantageous to recall the components of a recording and/or reading system of such a support or medium. In particular, it relates to an optical recording and reading system, whose head moves parallel to one radius of the disk carrying the data. Such a disk can be used either for recording data at a pedetermined point of a perviously recorded smooth disk, or for reading the data recorded at a random point on said track. The disk, which has a diameter of about 30 cm performs a rotary movement imparted to it by a drive motor integral with the chassis of the optical recording-reading system. The device giving access to a predetermined track of the disk comprises a fixed part constituted by light energy sources and a moving part constituted by the recording-reading head. The latter comprises a microscopic lens or objective integral with an electrodynamic coil moving in the magnetic field of a permanent magnet ensuring the vertical control and a galvanometer mirror, whose pivoting about an axis ensures the radial control. The light energy sources, as is known, comprise laser sources, e.g. He-Ne gas lasers. These lasers supply a polarized parallel beam having a very small cross-section. The laser beam must be widened and collimated so as to cover the entrance pupil of the lens, no matter what the radial position of the reading head. Thus, an afocal optical system is inserted between the light energy sources and the moving recording-reading head.

For reading purposes, the parallel, polarized laser beam $f_1$ produced by a laser source (not shown in FIG. 1) is widened by means of an afocal system comprising two lenses $L_1$ and $L_2$, whose magnification is such that the also parallel emergent beam covers the entrance pupil of a microscopic objective $O_b$. A deviating mirror M is inserted between this afocal system and objective $O_b$ in order to deviate in a direction parallel to the axis OZ the rays received parallel to the axis OX. Objective $O_b$ focuses the reading beam on point 3 of the data support disk 5. This disk performs a rotary movement symbolized by arrow 6. The objective and the mirror are integral with a moving element constituting the recording-reading head.

This device which disassociates the light sources from the actual recording-reading head makes it possible to reduce the weight of the moving element and thus obtained reduced access times.

If the intention is to record signals, the same afocal system can be used for the recording beam, which has been previously modulated as in conventional recorders-readers. In order to differentiate the reading and recording spots of the disk, the recording beam $f_e$ is inclined very slightly relative to the reading beam $f_1$. The transverse magnification is much greater than 1, so that the ratio of the angles is below 1. The off-centering of the recording spot relative to the entrance beam of the objective is therefore very limited. It is also possible to ignore this displacement during a radial displacement of the head. It follows that no matter what the position of the objective along the optical axis, the recording beam is focused on the focus of the objective, whilst still ensuring a good discrimination, at the outlet from the afocal system, of the recording and reading beams.

FIG. 1 illustrates the path of the light rays in space. Disk 5 is essentially parallel to a plane XOY. The vertical control takes place in a direction parallel to axis OZ. The optical axis of the afocal system comprising two lenses $L_1$ and $L_2$ is parallel to axis OX. Mirror M has a slope varying around $\pi/4$ radians relative to the XOY plane.

As a non-limitative example, typical values are focal distances of $L_1$: 8 mm and of $L_2$: 100 mm; focal distance $O_b$: 8.25 mm and numerical aperture NA: 0.455, with a diameter of 7.51 mm.

Figure 2:
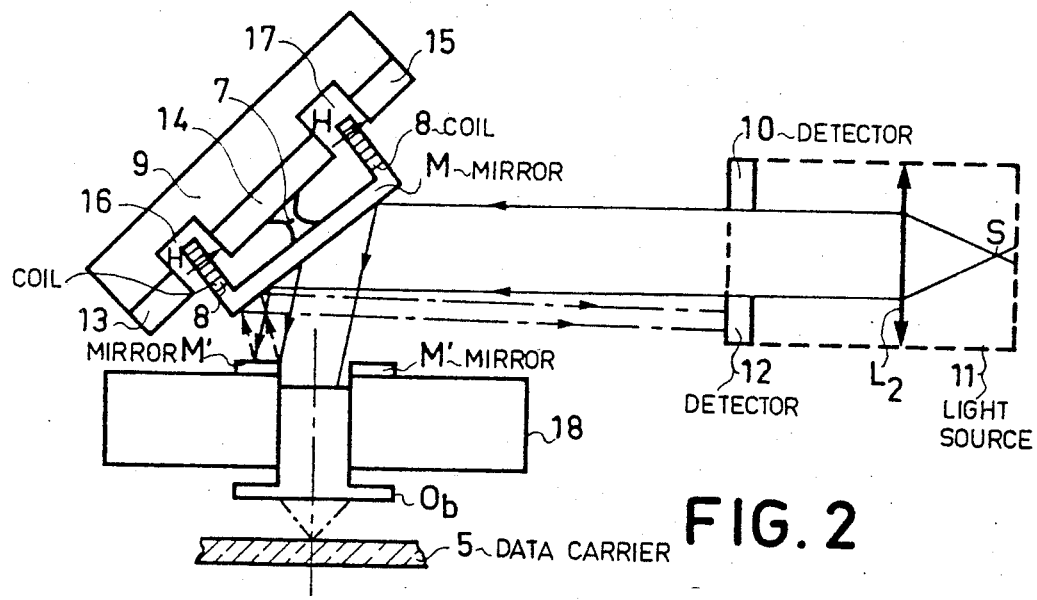
Figure 3:
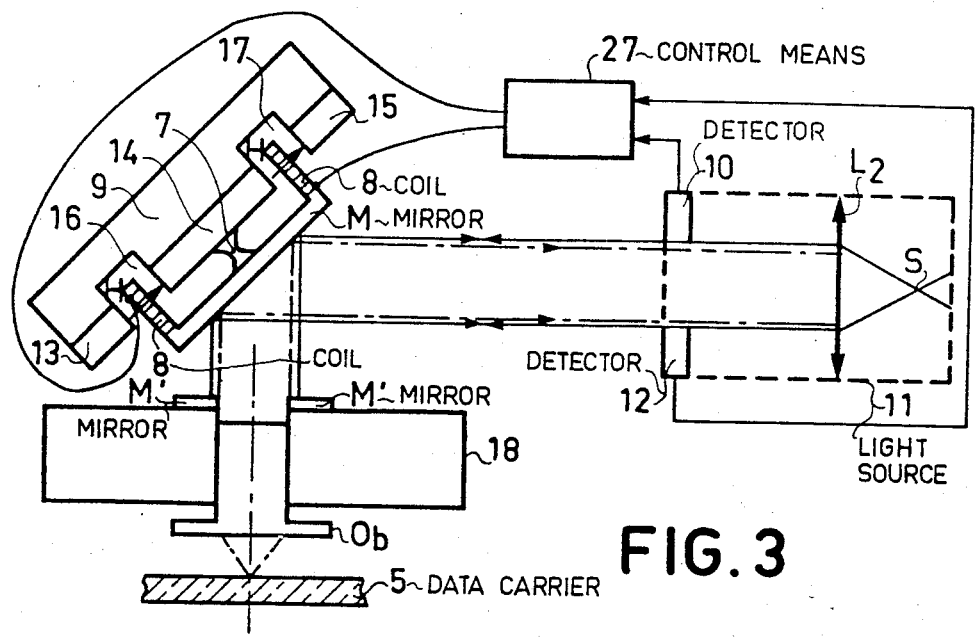

The mirror (M) of the device of FIG. 1 used for the radial control of the optical head can be constructed in the manner illustrated in FIGS. 2 and 3.

In this case, on considering the assembly formed by the moving element, the deflecting system is constituted by a group of moving parts resting on a group of fixed parts with respect to the moving element by means of an elastic element 7 with an X-shaped cross-section.

In this example, the inclinable reflecting plane is the reflecting surface of mirror M, which receives the collimated beam from light source 11. To the lower face of the mirror is stuck a frame supporting coil 8. The mirror is rectangular and the coil is a frame with a rectangular cross-section and of dimensions slightly smaller than those of the mirror.

The group of fixed parts comprises a base 9 on which are arranged three ferrite blocks 13, 14, 15 so as to provide two spaces 16 and 17 parallel to two sides of the mirror in which there are two identical magnetic fields directed in accordance with the direction of arrows $\vec{H}$.

Mirror M is connected to ferrite block 14 serving as a fixed plane by means of the prismatic rubber element 7, whose upper lateral face is stuck to the lower face of mirror M and whose lower lateral face is stuck to the upper face of ferrite block 14. The two opposite sides of the coil are immersed in spaces 16 and 17 in which there is a permanent magnetic field $\vec{H}$.

When the coil is excited by an electric current I, these two opposite sides of the coil are subject to two forces of the same intensity, but of opposite direction. Therefore, mirror M is pivoted about the rotation axis materialised by the constriction of the elastic element. As the latter exerts an elastic restoring torque on the mirror, the mirror is oriented into a position, which is a function of the intensity of electric current I, so that it is possible to control the orientation of the mirror. In an application to a video disk, such a deflecting system is used for the radial control of the optical beam on the track cut on the disk.

In another embodiment, the optical deflector can ensure, besides the radial control, the tangential control of the reading beam. For this purpose, it has two orthogonal rotation directions, which is very simply obtained by superimposing a second moving plane supporting the mirror on the first moving plane by means of a second elastic prismatic element arranged parallel to the first. Thus, the mobile balance is split into two coiled frames respectively carrying the mirror and a magnetically conductive intermediate plate. The articulation means comprise two crossed prismatic elastic elements, one of them connecting the base of the moving element to the lower face of the plate and the other connecting the back surface of the mirror to the upper surface of said plate. Fixed and crossed magnetic fields are produced in the air gaps in which are immersed the coiled frames as a result of solid ferrite parts integral with the moving element.

In the device of FIGS. 2 and 3, the pivoting axis of the galvanometer mirror M does not coincide with the center of gravity of the pivoting structure. Furthermore, during a rapid displacement of the moving element, the acceleration imparted to the mirror gives rise to a maximum torque which disorientates the mirror. In FIGS. 2 and 3, the galvanometer mirror can rotate about the axis materialised by the constricted section of the support having an X-shaped cross-section. The untimely pivoting due to the acceleration undergone during a rapid displacement of the optical head disturbs the radial control.

FIG. 2 shows an lack of balance position resulting from such a displacement. The part of the incident beam reflected by plane mirror M', which is shaped like a ring, and then by mirror M trapped by one of the optical detectors 10 is different from the part trapped by the other optical detector 12. These detectors can, for example, be photoreceiving diodes.

The signals detected by these elements are then directed towards the differential inputs of e.g. an operational amplifier. The output signal ($\epsilon$) of this amplifier is not zero due to the lack of balance and by means of a power amplifier 21 shown in FIG. 4 a current for controlling coil 8 is then produced. A negative current feedback 22 of an amplifier 21 makes it possible to stabilize the control current of said coil. Thus, any displacement of the visible beam on optical detectors 10 and 12 leads to a negative feedback of the radial coil, so that the beam is recentered in the centre of said detectors.

In this case illustrated in FIG. 3 where the control is effective, the signal supplied by the two detectors 10 and 12 have a substantially identical amplitude and the output signal of amplifier 19 is then almost zero. Thus, the light energies collected by these two detectors are equivalent. FIG. 3 shows the control means 27 making it possible to bring about the current control of coil 8 and thus make the position of the mirror dependent on the detected signals. FIG. 4 more specifically describes these control means. FIG. 4 shows optical detectors 10 and 12, but also the signals supplied by deviation detectors 23 and 24 which translate a slight displacement $\Delta e$ of the focusing point relative to the track carried by the data medium. This displacement is illustrated in FIG. 1. The present invention makes it possible to eliminate the lack of balance of the deviating mirror during the displacement of the optical head or any undesired acceleration, i.e. having an amplitude exceeding a tolerable threshold for satisfactory operation. However, when stopped this mirror also permits the radial control of the head by taking account of a deviation $\Delta e$ of the focusing point relative to the track carried by the medium. Thus, the power amplifier takes account either of the deviation $\epsilon$ during the displacement, or the deviation $\epsilon'$ during the stoppage of the optical head. Thus, switch 26 in FIG. 4 is a threshold switching circuit. It has two operating positions and is controlled by control circuit 25.

A pivoting of the mirror along a rotation axis has hitherto been envisaged. However, it is also possible for these rotations to follow two axes. Two pairs of photodetector means then make it possible to compensate the lack of balance of the mirror into two directions.

The aforementioned device can inter alia be used in a system for the optical transcription of data stored on a track of an optical disk.

What is claimed is:

1. A compensation system for balancing an optical head which is used for projecting a light beam onto a data carrier which data carrier is provided with track elements with said optical head being movable in order to cause said light beam to project to a location for interaction with any one of said track elements and wherein said optical head further includes a pivotable mirror actuated by a motor and a first tracking servo loop with said mirror and said servo loop causing said light beam to remain in registration with said any one of said track elements;

a second tracking servo loop for counteracting a tilting of said pivotable mirror which tilting takes place when said optical head is subject to acceleration wherein said second tracking servo loop comprises a means for sensing said tilting and a means for deriving a control signal which control signal is fed to the control input of said motor to thereby counteract said tilting wherein said first and second tracking servo loops are each connected to said control input of said motor by means of a changeover switch.

2. The system according to claim 1, wherein said optical head further comprises:

an objective lense for projecting said light beam;

a source of light arranged to provide a said light beam impinging on said objective lense after being reflected by said pivoting mirror;

and wherein said means for sensing said tilting and said means for deriving a control signal comprises at least one pair of photodetector cells electrically connected respectively to the complementary inputs of a differential amplifier wherein the output of said differential amplifier provides said control signal with said photodetector cells being arranged to collect a portion of said beam reflected by said pivoting mirror.

3. The system according to claim 2, wherein said portion of said radiation beam has undergone two reflections at said pivotable mirror and a further reflection at an annular reflective element surrounding the entrance pupil of said objective prior to being collected by said cells.

4. The system according to claim 3, wherein said source is fixed and optically coupled to said movable head and wherein said source comprises collimator means and said cells.

5. The system according to claim 2, wherein said radiation beam is a collimated beam.

6. The system according to claim 1, wherein said pivotable mirror has two pivoting axes.

* * * * *